(12) United States Patent
Zschunke et al.

(10) Patent No.: US 8,092,587 B2
(45) Date of Patent: Jan. 10, 2012

(54) STABLE AQUEOUS DISPERSIONS OF PRECIPITATED SILICA

(75) Inventors: Florian Zschunke, Frankfurt am Main (DE); Burkhard Standke, Loerrach (DE); Stefan Scharfe, Erlensee (DE); Christoph Batz-Sohn, Hanau-Mittelbuchen (DE); Heinz Lach, Rodenbach (DE); Andrea Heuschen, Floersbachtal (DE); Juergen Behnisch, Rheinbach (DE); Markus Ruf, Alfter-Witterschlick (DE); Guenter Stein, Nidderau 4 (DE); Tobias Banert, Hanau (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 13/011,115

(22) Filed: Jan. 21, 2011

(65) Prior Publication Data

US 2011/0179970 A1     Jul. 28, 2011

(30) Foreign Application Priority Data

Jan. 22, 2010   (DE) .......................... 10 2010 001 135

(51) Int. Cl.
*C01B 33/141* (2006.01)
*C01B 33/149* (2006.01)

(52) U.S. Cl. .................. 106/482; 106/14.05; 106/14.15; 106/14.44; 106/287.11; 106/287.12; 106/287.34; 106/490; 106/491; 162/158; 162/181.6; 162/183

(58) Field of Classification Search .................. 106/482, 106/491, 287.34, 14.05, 14.15, 14.44, 287.11, 106/287.12, 490; 162/158, 181.6, 183
See application file for complete search history.

(56) References Cited

U.S. PATENT DOCUMENTS

| | | | | |
|---|---|---|---|---|
| 3,290,165 A * | 12/1966 | Iannicelli | ...................... | 106/475 |
| 3,567,680 A * | 3/1971 | Iannicelli | ...................... | 524/262 |
| 3,834,924 A * | 9/1974 | Grillo | ........................... | 106/490 |
| 5,168,082 A * | 12/1992 | Matchett et al. | ............. | 501/133 |
| 6,417,264 B1 | 7/2002 | Kono et al. | | |
| 6,420,039 B1 | 7/2002 | Field et al. | | |
| 6,777,039 B2 | 8/2004 | Koike et al. | | |
| 7,056,449 B2 * | 6/2006 | Hoefler | ........................ | 252/8.57 |
| 7,753,974 B2 * | 7/2010 | Miyabe et al. | .................. | 51/308 |
| 7,839,562 B2 * | 11/2010 | Hosoya et al. | ................ | 359/296 |
| 2002/0040661 A1 * | 4/2002 | Glaum et al. | ............ | 106/287.35 |
| 2004/0034123 A1 * | 2/2004 | Hoefler | ......................... | 523/216 |
| 2005/0020699 A1 | 1/2005 | Isobe et al. | | |
| 2006/0013971 A1 | 1/2006 | Chen et al. | | |
| 2006/0178452 A1 * | 8/2006 | Hoefler | ......................... | 523/212 |
| 2008/0069753 A1 | 3/2008 | Floess et al. | | |
| 2008/0216709 A1 * | 9/2008 | Steingrover et al. | ..... | 106/287.11 |
| 2008/0287038 A1 * | 11/2008 | Miyabe et al. | .................. | 451/36 |
| 2010/0292386 A1 * | 11/2010 | Okel | ............................ | 524/492 |

FOREIGN PATENT DOCUMENTS

| | | |
|---|---|---|
| DE | 10033054 | 4/2001 |
| DE | 102007040802 | 3/2009 |
| DE | 102009001966 | 10/2010 |
| EP | 0329509 | 8/1989 |
| EP | 0368722 | 5/1990 |
| EP | 0716127 | 6/1996 |
| EP | 0716128 | 6/1996 |
| EP | 0846717 | 6/1998 |
| EP | 1101787 | 5/2001 |
| EP | 1894888 | 3/2008 |
| FR | 2831178 A1 * | 4/2003 |
| FR | 2831179 A1 * | 4/2003 |
| JP | 09-142827 | 6/1997 |
| WO | WO 90/03330 | 4/1990 |
| WO | WO 97/34849 | 9/1997 |
| WO | WO 2008/046854 | 4/2008 |

OTHER PUBLICATIONS

Degussa AG, "Sipernat—Performance Silica," brochure (Nov. 2003) 31 pages.
Evonik Degussa GmbH, "Product Information SIPERNAT® 304N," Apr. 2008, 2 pages.
Evonik Degussa GmbH, "Product Information SIPERNAT® 310," Apr. 2008, 2 pages.
Ullmann's Encyclopedia of Industrial Chemistry, 5th edition, vol. A23, (1985) p. 629-635.
Ullmann's Encyclopedia of Industrial Chemistry, 5th edition, vol. A23, (1985) p. 642-647.
European Patent Office Search Report for Application No. 10197057 dated May 11, 2011 (3 pages).

* cited by examiner

*Primary Examiner* — Anthony Green
(74) *Attorney, Agent, or Firm* — Michael Best & Friedrich LLP

(57) ABSTRACT

The invention relates to stabilized dispersions of precipitated silicon dioxide, to a process for production thereof and to the use thereof, especially for production of paper coatings for glossy photo paper for inkjet printing.

19 Claims, No Drawings

STABLE AQUEOUS DISPERSIONS OF PRECIPITATED SILICA

CROSS-REFERENCE TO RELATED APPLICATIONS

This patent application claims priority to German Patent Application No. 102010001135.5, filed Jan. 22, 2010, the disclosure of which is incorporated by reference herein in its entirety.

FIELD OF THE INVENTION

The present invention relates to stabilized dispersions of precipitated silica, to a process for production thereof and to the use thereof, especially for production of paper coatings for glossy photo paper for inkjet printing.

BACKGROUND

Dispersions based on precipitated silicon dioxide have already been described in the prior art. A core theme in the prior art publications is the stabilization of the dispersions.

For example, Japanese published specification JP09142827 describes stable silica dispersions, the storage stability of which is achieved by virtue of the mean particle size of the silica particles being less than 100 nm. These dispersions have the disadvantage that it is very complicated and energy-intensive to grind silica particles to such small particle sizes. The process described in JP0914287 is therefore unlikely to gain any technological relevance for economic reasons.

EP 0368722, EP 0329509, EP 0886628 and EP 0435936 describe dispersions of silicas stabilized by means of stabilizers. One reason for adding the stabilizers is to prevent the sedimentation of the particles. The stabilizers are, for example, biogum or a system composed of aluminium compounds and anionic dispersants, or latex, or finely divided solids, which are chemically and physically compatible with the silicon dioxide. The use of such stabilizers is disadvantageous both for reasons of cost and with regard to the later use of the dispersions. More particularly, such dispersions are unsuitable for production of topcoats for high-gloss photo paper for inkjet printing.

Another approach to the stabilization of silicon dioxide dispersions is presented in DE102006049526.8. This describes dispersions of precipitated silica which are storage-stable owing to an alkaline pH and a strongly negative zeta potential. These are thus anionically stabilized dispersions. However, these dispersions are unsuitable for production of topcoats for high-gloss photo paper for inkjet printing, since the usually anionic dyes have to be fixed on a cationic porous print carrier, in order to achieve water resistance and high brightness among other properties.

Cationically stabilized dispersions are likewise already known. For instance, DE-A-10033054 describes the stabilization of a silica dispersion with the aid of cationic organic polymers. U.S. Pat. No. 6,777,039 describes the production of a coating for an inkjet printing medium by adding an aqueous solution of polyvinyl alcohol, an organic solvent and a surfactant to a dispersion of silica and a cationic polymer. U.S. Pat. No. 6,417,264 describes a dispersion of silica, which has been dispersed with an organic cationic polymer in a polar solvent. U.S. Pat. No. 6,420,039 describes a cationic silica dispersion in which $SiO_2$ particles are bonded to an aluminium compound in order to achieve stabilization.

Stabilization with cationic polymers, for example p-DAD-MAC, is of interest in particular for dispersions of fumed silicon dioxides. For dispersions of precipitated silicas, however, this method has been found to be problematic since polyvalent anions from the precipitation process, for example sulphate ions, led to the reagglomeration of the dispersed silica particles. Therefore, the methods mentioned have insufficient suitability for the cationic stabilization of precipitated silica dispersions.

An alternative approach to the cationic stabilization of silica dispersions is given by EP 1 894 888 A1. This discloses that direct modification of silica with aminosilanes gave, in a simple manner, highly stable dispersions with a minimum of additional reagents. However, the dispersions obtainable by this process, according to the examples, have solids contents of only 10 to 19% by weight, which appears unsuitable for a commercial application.

Owing to the significantly lower production costs for precipitated silicas compared to fumed silicas, there is still a need for a process which allows inexpensive production of cationically stabilized precipitated silica dispersions with high solids content and good storage stability. Ideally, this process should allow the stabilization of the precipitated silica dispersion even in the presence of polyvalent anions or significant amounts of inorganic salts in the dispersion, such that it is unnecessary to fully remove these salts/anions in complex purification steps.

SUMMARY OF THE INVENTION

It was therefore an object of the present invention to provide a process for producing cationically stabilized precipitated silica dispersions, which does not have at least some of the disadvantages of the processes known from the prior art. It was a specific object of the present invention to provide a process which allows production of cationically stabilized precipitated silica dispersions in the presence of polyvalent anions and/or significant amounts of inorganic salts. It was a very specific object to provide a process for producing precipitated silica dispersions comprising polyvalent anions and with a high solids content, preferably of more than 20% by weight, and good storage stability. More particularly, it was an object to provide a process for producing cationically stabilized precipitated silica dispersions in the presence of polyvalent anions, which can be processed further to produce a topcoat for glossy inkjet paper.

It was a further object of the present invention to provide novel cationically stabilized precipitated silica dispersions which have at least some of the disadvantages of the prior art silicon dioxide dispersions only to a reduced degree, if at all.

Further objects which are not stated explicitly are evident from the overall context of the description, examples and claims which follow.

DETAILED DESCRIPTION

The inventors have found that it is surprisingly possible, by surface modification of precipitated silica particles with aminosilanes in a suitable process which comprises the production of a preliminary dispersion and then the grinding of the preliminary dispersion in a suitable mill, to produce dispersions which are outstandingly suitable as a starting dispersion for further processing to a topcoat for glossy inkjet paper. Using the process defined in detail in the claims and the description which follows, it has been possible to produce stable dispersions of precipitated silicas even in the presence of inorganic salts, more particularly those with polyvalent anions. The process according to the invention thus has, in contrast to the known processes in which cationic polymers are added, the great advantage that it is possible to dispense with a complex purification stage to remove the salts and/or polyvalent anions down to the ppm range. This is an essential step in order to make the market for coating slips for inkjet media—which has to date been reserved exclusively for the fumed silicas owing to the problems with the inorganic salts and polyvalent anions in the case of precipitated silica—accessible to precipitated silicas as well. Owing to the good availability and the low production costs for precipitated silicas, this in turn leads to a considerable cost advantage.

As already indicated above, precipitated silica dispersions in the presence of polyvalent anions can be stabilized only insufficiently with cationic polymers, for example p-DADMAC. In the course of their research work, the inventors have found that problems occur in the course of grinding when precipitated silica dispersions are stabilized with p-DADMAC in the presence of polyvalent anions; in other words, simple grinding techniques, for example ball mills, cannot reduce the mean particle size $d_{50}$ of the precipitated silica particles in the dispersion far enough. Without being bound to a particular theory, the inventors are of the view that this is because of the polyvalent anions, for example sulphate ions, which are introduced by the acidifying agent during the precipitation. Only when these are virtually completely removed is a stabilization with cationic polymers such as p-DADMAC possible. With the process according to the invention, it was possible to dispense with this additional purification step and nevertheless to obtain particles with a sufficiently small mean particle size. This is necessary in order to achieve a high image quality in paper coatings.

In addition to the sufficiently small particle size, the process according to the invention also allows production of dispersions with narrow particle size distribution, which is likewise important for the image quality of paper coatings. For instance, a very high resolution requires very small diameters of the ink drops absorbed. These in turn depend on the particle size of the ink-absorbing particles. A broad particle size distribution also includes quite large particles and is therefore unsuitable for high-resolution inkjet printing.

Compared to the processes known to date for production of aminosilane-stabilized precipitated silica dispersions, for example from EP 1 894 888, in which the silane and the silicon dioxide are merely mixed with one another and optionally sheared but not ground, the process according to the invention offers the advantage that the grinding forms new surfaces on the silica particles, which can react directly with the silane before reagglomeration. While other publications, for example EP 1 894 888, specify high solids content for the dispersions in general terms, but the examples achieve only solids contents below 20% by weight, it is indeed possible with the process according to the invention to achieve high solids contents of more than 25% by weight without preceding complete removal of the polyvalent anions.

The present invention thus provides a process for producing dispersions comprising precipitated silica, characterized in that it comprises the steps of
a) producing a preliminary dispersion of at least one precipitated silica
and
b) supplying the preliminary dispersion to a grinding device with subsequent grinding,
and in that, in the course of the process, at least parts of the surface of the precipitated silica particles and/or of the surface of the precipitated silica particles newly generated during the grinding are coated with at least one aminosilane in such a way that the aminosilane is attached covalently to the precipitated silica particles via an Si—O—Si bond.

The present invention further provides dispersions of precipitated silica, characterized in that
a) at least one aminosilane is bonded covalently to at least some sites on the surface of the precipitated silica particles via an Si—O—Si bond,
b) the mean diameter $d_{50}$ of the surface-modified precipitated silica particles is between 50 and 500 nm, and/or the $d_{90}$ of the particle size distribution curve of the surface-modified precipitated silica particles is between 150 and 800 nm,
c) the solids content of the dispersion is greater than or equal to 20% by weight,
d) the pH of the dispersion is less than or equal to 5.

The present invention finally provides for the use of the inventive precipitated silica dispersions for production of paper coatings, preferably paper coatings for inkjet paper, more preferably as a topcoat for glossy inkjet paper or as an anticorrosive primer for the coating of steel components, preferably steel pipes.

The subject-matter of the present invention is described in detail hereinafter; in this description, the terms "silica", "precipitated silica" and "precipitated silicon dioxide" are used synonymously. In all cases, these are understood to mean precipitated silicon dioxide as described, for example, in *Ullmann's Encyclopedia of Industrial Chemistry*, 5th edition, vol. A23, p. 642-647. To avoid pure repetition, the content of this publication is hereby incorporated explicitly into the subject-matter and the description of the present invention. Precipitated silicon dioxide may have BET surface areas up to 800 $m^2/g$ and is obtained by reaction of at least one silicate, preferably of an alkali metal silicate and/or alkaline earth metal silicate, with at least one acidifying agent, preferably at least one mineral acid. In contrast to silica gels (see *Ullmann's Encyclopedia of Industrial Chemistry*, 5th edition, vol. A23, p. 629-635), precipitated silicas do not consist of a homogeneous three-dimensional $SiO_2$ network, but of individual aggregates and agglomerates. A particular feature of precipitated silicon dioxide is the high proportion of so-called internal surface area, which is reflected in a very porous structure with micro- and mesopores.

Precipitated silicas additionally differ from fumed silicas, which are also known as AEROSILS® (see *Ullmann's Encyclopedia of Industrial Chemistry*, 5th edition, vol. A23, p. 635-642). Fumed silicas are obtained by means of flame hydrolysis from silicon tetrachloride. Owing to the completely different preparation process, fumed silicas, among other properties, have different surface properties from precipitated silicas. This is expressed, for example, in the lower number of silanol groups on the surface. Moreover, the production of fumed silicas does not give rise to any polyvalent anions. The behaviours of fumed silicas and precipitated silicas in aqueous dispersions, which are determined principally by the surface properties, therefore cannot be compared with one another. One advantage of precipitated silicas over fumed silicas is that they are significantly less expensive.

The process according to the invention is a process for producing dispersions comprising fumed silica, wherein at least one aminosilane is attached covalently to at least some sites on the surface of the precipitated silica particles via an Si—O—Si bond, and the process comprises the steps of
a) producing a preliminary dispersion of at least one precipitated silica and
b) supplying the preliminary dispersion to a grinding device with subsequent grinding.

To produce the preliminary dispersion, it is possible in principle to use any precipitated silica irrespective of the physical form thereof. For example, it is possible to use a precipitated silica in dried form, for example in powder, granule or micropearl form, or in the form of a washed or unwashed filtercake. However, it is also possible to directly use a precipitate suspension. The use of an unwashed filtercake or a precipitate suspension has the disadvantage that very high amounts of inorganic salts, for example sodium sulphate, are typically present. Too high a salt concentration may be disadvantageous for some uses. It may therefore be advantageous first to filter the dispersion, to wash it and then to redisperse the filtercake obtained. This variant thus has the advantage of a reduced salt content over the use of unwashed filtercake or of a precipitate suspension; in contrast, it has the advantage over the use of dried precipitated silicas that there is no need to dry, and this dispenses both with process steps and with energy costs. Thus, particular preference is given to the use of a washed filtercake. The washing of the filtercake—as carried out routinely in any production of precipitated silica—reduces the amount of inorganic salts significantly, but not so far that intrinsic stabilization of silica dispersions or stabilization thereof with cationic polymers such as p-DADMAC would be possible. This has already been addressed above in detail. For stabilization with cationic polymers, it would be necessary to carry out specific, very complex steps for high purification, which is costly and time-consuming. For the process according to the invention, a standard wash is sufficient; residual amounts of inorganic salts and especially polyvalent anions are not disruptive.

The use of dried precipitated silicas may be advisable when, for example, a plurality of precipitated silicas are to be mixed or when the precipitated silica first has to be transported to the site of production of the dispersion. The process according to the invention of course also encompasses mixed forms of the aforementioned processes, i.e., for example, the production of a preliminary dispersion from a precipitated silica powder and a filtercake. By mixing of different precipitated silicas, the process according to the invention opens up the possibility of being able to tailor the properties of the dispersion.

The precipitated silicas present in the inventive suspension can be produced by any desired processes and may have a profile of properties tailored to the planned field of use. Particular preference is given to using those silicas as described in the product brochure "Sipernat—Performance Silica" from Degussa AG, November 2003. Precipitated silicas from other manufacturers, for example W. R. Grace & Co., Rhodia Chimie, PPG Industries, Nippon Silica, Huber Inc. can of course likewise be used. Particular preference is given to using Sipernat® 200 and Carplex® 80 from Evonik Degussa GmbH.

Inorganic salts containing polyvalent anions are preferably understood to mean those with di- or trivalent anions, more preferably sulphate ions. The inorganic salts comprise salts which arise in the precipitation reaction, salts which have been added as an electrolyte before or during the precipitation reaction and/or other undesired inorganic or organic salts which are present in the suspension, for example salts which were already present as impurities in the reactants of the precipitation reaction or in the dispersion medium. The silica used to produce the preliminary dispersion, or the filtercake or the dispersion (for example liquefied filtercake, precipitate suspension), more preferably has a total content of the polyvalent sulphate, phosphate and carbonate anions, based on the weight of silicon dioxide and the impurities present therein, of 0.005 to 2% by weight, preferably 0.05 to 1% by weight, more preferably 0.08 to 0.3% by weight.

The precipitated silicas used in the process according to the invention have, on their surface, reactive groups which can react with the aminosilane. The reactive groups on the silica surface include both those which are already present on the particles used and those which are formed during the dispersing operation, i.e. in the course of production of the preliminary dispersion or in the course of grinding. The reactive groups are predominantly or exclusively OH groups.

The mean particle diameter $d_{50}$ of the precipitated silica particles present in the preliminary dispersion is preferably greater than 100 nm, more preferably 200 nm to several hundred micrometers. The particles include primary particles, aggregates and agglomerates. The mean particle diameter $d_{50}$ is usually 1 to 500 µm. It can be determined, for example, by dynamic light scattering.

The solids content of precipitated silica in the preliminary dispersion, based on the total weight of the preliminary dispersion, is preferably 5 to 40% by weight, more preferably 20 to 40% by weight and most preferably 25 to 35% by weight.

As already indicated, it is a particular advantage of the process according to the invention that the inorganic salts or polyvalent anions introduced into the dispersion by the precipitated silica need not be removed completely. The preliminary dispersion therefore has, in a preferred embodiment of the process according to the invention, a content of inorganic salts of 0.00015 to 0.6% by weight, more preferably 0.0015 to 0.3% by weight, even more preferably 0.0024 to 0.09% by weight and especially preferably 0.0024 to 0.03% by weight, based in each case on the total weight of the preliminary dispersion. It should be pointed out here that the process according to the invention displays its particular value in the case of dispersions containing polyvalent anions, but the process can of course also be employed in the case of dispersions containing monovalent anions and these processes are also included.

In addition to at least one precipitated silica, the preliminary dispersion generally comprises water as a dispersant, preferably desalinated or demineralized water. The techniques for desalinating water, for example distillation or reverse osmosis, are known to those skilled in the art. In addition, the preliminary dispersion may contain various solvents. These may be one or more organic solvents, which are generally added in smaller proportions, for example as a cosolvent. Suitable additional organic solvents or dispersants are both polar and nonpolar, and aprotic solvents.

The preliminary dispersion preferably also comprises an acidifying agent by which the pH of the preliminary dispersion is adjusted more preferably to a value of 2 to 6, most preferably 3 to 5. The acid used may be any organic or inorganic acid known to those skilled in the art. The acid preferably contains at least one acid group having a pKa of <6. Examples are hydrochloric acid, nitric acid, phosphoric acid, sulphuric acid, formic acid, acetic acid, propionic acid, trioxadecanoic acid, citric acid and sulphonic acids. Preference is given to using a monovalent organic or inorganic acid, more preferably hydrochloric acid and most preferably formic acid. This has the advantage that no further polyvalent anions are introduced into the preliminary dispersion in the course of acidification. The acid can be added as such or in a solvent. Preference is given to adding the acid in the form of an aqueous solution.

The process according to the invention and the inventive dispersions have the advantage that they are sedimentation-stable without addition of specific stabilizers. This advantage does not of course rule out that such stabilizers are nevertheless added, although this is more preferably done only in amounts of less than 2% by weight based on the total weight of the dispersion, or not at all.

The preliminary dispersion is produced by introducing the individual components into a vessel and processing them by means of a suitable dispersing unit to give a homogeneous preliminary dispersion. The preliminary dispersion can be produced with a significantly lower energy input than the dispersion. The energy input is preferably in the range from 0.01 kWh/kg of solids to 0.05 kWh/kg of solids. For example, it is possible to use simple stirrers, dissolvers or rotor/stator machines. The preliminary dispersion step principally serves the purpose of breaking up any agglomerates of surface-modified silicon dioxide particles which can form as a result of the combination of aggregates via cohesive forces. This generates additional surface area which can react with the aminosilane.

The finished preliminary dispersion is subsequently supplied to a grinding device and ground at least once. The grinding device is preferably a stirred ball mill or a jet mill, more preferably a stirred ball mill. Very particular preference is given to using stirred ball mills whose grinding space is coated with an abrasion-resistant ceramic or PU, in combination with grinding balls made from yttrium-stabilized zirconium oxide.

The grinding is preferably performed until the mean diameter $d_{50}$ of the surface-modified precipitated silica particles is between 50 and 500 nm, preferably 80 to 300 nm, more preferably 100 to 200 nm and most preferably 110 to 160 nm, and/or the $d_{90}$ of the particle size distribution curve of the surface-modified precipitated silica particles is between 100 and 800 nm, preferably 100 to 500 nm, more preferably 120 to 300 nm, even more preferably 130 to 250 nm, especially preferably 150 to 200 nm and very especially preferably 150 to less than 200 nm. The energy input during the grinding is preferably in the range from 0.1 kWh/kg of solids to 1 kWh/kg of solids, more preferably 0.1 kWh/kg of solids to 0.5 kWh/kg of solids.

The solids content of the finished dispersion after step b) is 20 to 60% by weight of $SiO_2$ based on the total weight of the dispersion, preferably 25 to 50% by weight, more preferably 25 to 40% by weight. Should the desired solids content still not be attained after the grinding, the solids content can be adjusted by means of dilution with the abovementioned water or by concentration. Concentration techniques are known to those skilled in the art.

The surface modification with at least one aminosilane in the context of the process according to the invention can be performed in such a way that at least one aminosilane is added before and/or during and/or after the grinding, i.e. step b). Preference is given to adding at least one aminosilane during and/or after step b) and/or to the finished preliminary dispersion before step b) and/or before the production of the preliminary dispersion and/or during the production of the preliminary dispersion. More particularly, the following embodiments are encompassed:

In variant 1, at least one aminosilane is added during and/or after the grinding, i.e. after step b). In a preferred variant, 1a), grinding is effected in step b), followed by addition of at least one aminosilane and grinding once again. In another preferred variant, 1b), the aminosilane is added continuously or discontinuously, all at once or over a prolonged period, during the grinding in step b). In variant 2, at least one aminosilane is added to the finished preliminary dispersion and then ground. This variant 2 comprises two subvariants. In subvariant 2a, at least one aminosilane is added to the finished preliminary dispersion and stirring is continued for a defined period, preferably 10 to 60 min, more preferably 20 to 40 min, such that the aminosilane can react with the precipitated silica particles. This is then followed by grinding. In variant 2b, at least one aminosilane is added to the finished preliminary dispersion and ground immediately. In variant 3a, the aminosilane is added before the production of the preliminary dispersion, and the silica is allowed to react with the silane for a defined period, preferably 10 to 60 min, more preferably 20 to 40 min. In variant 3b, the aminosilane is added during the production of the preliminary dispersion. Any desired mixed forms or modifications of the abovementioned variants are also encompassed by the present invention.

Variants 1a, 1b, 3a and 3b have been found to be particularly preferred. The process in which the aminosilane is first added to the precipitated silica, then at least partial reaction between aminosilane and precipitated silica is awaited, followed by grinding, was found to be particularly advantageous because it was possible with the dispersion obtained to obtain topcoating for inkjet paper which exhibited the best transparency. In addition, these topcoats exhibited very good gloss values, good colour intensities after inkjet printing and good ink absorption properties. The process variant in which the grinding is carried out immediately after addition of the aminosilane to the preliminary precipitated silica dispersion likewise leads to very good results, for example to the best ink absorption properties. However, compared to the aforementioned variant, slightly poorer gloss values and colour intensities are noted. Nevertheless, these two variants are particularly preferred.

The temperature in the reaction of aminosilane with the precipitated silica is preferably above 60° C. and more preferably 60 to 100° C.

The aminosilane should have free OH groups in order to be able to react with the silica. Such OH groups, however, may also be obtained from hydrolysable groups of the silane. For instance, it is known that hydrolysable groups of silanes can be hydrolysed in the presence of water to form free OH groups. It is also known that acids can catalyse this hydrolysis. To what degree the hydrolysis of the acidic aminosilanes takes place depends on several factors, for example pH, type of silane, time between addition of the acid to the aminosilane and mixing of the aminosilane solution with silica, and can be controlled by the person skilled in the art in the manner desired. Irrespective of the variant of the process according to the invention, it should therefore be ensured that an acidifying agent is added to the dispersion before and/or during and/or after the addition of the aminosilane. Preference is given to adding a sufficient amount of acidifying agent that the pH of the reaction medium, i.e. of the silane solution or of the dispersion, is less than 7, preferably 2 to 6, more preferably 3 to 5.

There may also be some condensation reactions between the hydrolysed aminosilanes, such that condensates may be present in the aminosilane solution after a certain time. Appropriately, however, too great a degree of condensate formation should be avoided, and so the period between production of the acidic aminosilane solution and mixing with silica should not be too great. This period should preferably not be more than 1 h and more preferably be at most 30 min.

In a specific variant of the present invention, the process is performed in such a way that the aminosilane is not added separately from the acid, but rather the aminosilane is first mixed with the acid and then acid and silane are added together. In this case, the pH of the aminosilane solution is preferably in the range from 2 to 6. It is also preferred that the solution is an aqueous acidic aminosilane solution. To prepare the acidic aminosilane solution, one or more aminosilanes are mixed with an acid. Both the aminosilane and the acid may be dissolved in a solvent, which is also preferred for both components. In a further preferred embodiment, the aminosilane solution is obtained by mixing undiluted aminosilane with the aqueous acid. Examples of solvents are water and organic solvents, preference being given in each case to water or an aqueous solvent, i.e. a solvent mixture with a predominant proportion of water. For examples of usable organic solvents and the possible proportions by volume of water in solvent mixtures, reference is made to the aforementioned examples for the silica dispersion.

The aminosilanes used preferably have the general formula $R_aSiX_{(4-a)}$ in which all X radicals may be the same or different and are each hydrolysable groups or hydroxyl groups, the R radicals are the same or different and are each unhydrolysable groups, where at least one R radical comprises at least one amino group, and a has the value of 1, 2 or 3, preferably 1 or 2.

In the general formula, X is a hydroxyl group or a hydrolysable group which may be the same or different from one another, for example hydrogen or halogen (F, Cl, Br or I), alkoxy (preferably C1-C6-alkoxy, for example methoxy, ethoxy, n-propoxy, i-propoxy and butoxy), aryloxy (preferably C6-C10-aryloxy, for example phenoxy), acyloxy (preferably C1-C6-acyloxy, for example acetoxy or propionyloxy), alkylcarbonyl (preferably C2-C7-alkylcarbonyl, for example acetyl), —N(H)—Si(R$_3$) (silazane, where R is as defined below), amino, monoalkylamino or dialkylamino having preferably 1 to 12 and especially 1 to 6 carbon atoms. X may also be a siloxy group, e.g. —OSiY$_3$, where Y may be the same or different and is one of the above-defined groups for X. Preferred hydrolysable radicals are halogen, alkoxy groups and acyloxy groups. Particularly preferred hydrolysable radicals are C1-C4-alkoxy groups, especially methoxy and ethoxy.

In the unhydrolysable R radicals, which may be the same or different from one another, at least one R radical has at least one amino group. There is preferably one unhydrolysable radical having at least one amino group. The R radicals may optionally have one or more customary substituents, for example alkyl, halogen or alkoxy.

Examples of unhydrolysable R radicals without amino groups are alkyl (preferably C1-C16-alkyl, such as methyl, ethyl, n-propyl, isopropyl, n-butyl, sec-butyl and tert-butyl, pentyl, hexyl, octyl or undecyl), cycloalkyl (preferably C4-C12-cycloalkyl, such as cyclopentyl or cyclohexyl), alkenyl (preferably C2-C6-alkenyl, for example vinyl, 1-propenyl, 2-propenyl and butenyl), alkynyl (preferably C2-C6-alkynyl, for example acetylenyl and propargyl), aryl (preferably C6-C10-aryl, for example phenyl and naphthyl) and corresponding alkaryls and aralkyls which contain preferably 7 to 24 carbon atoms (e.g. tolyl, benzyl and phenethyl). Preference is given to alkyl radicals.

In the unhydrolysable R radical having at least one amino group, the amino group may be present terminally, laterally and/or in the main chain of the radical. The R radical may also have two or more amino groups. The amino groups in the R radical are bonded to the silicon atom via alkylene, alkenylene or arylene bridging groups which may be interrupted by oxygen atoms. The divalent bridging groups mentioned derive, for example, from the abovementioned monovalent alkyl, cycloalkyl, alkenyl, aryl, alkaryl or aralkyl radicals. The bridging groups contain generally 1 to 18, preferably 1 to 12 and especially 1 to 6 carbon atoms. When amino groups are present in the main chain, two or more such bridging groups may be present.

The nitrogen atom of the amino group may be substituted or unsubstituted. The amino group(s) of the R radical may be primary, secondary or tertiary amino group(s) —NR$^1_2$ in the case of terminal or lateral amino groups, or —NR$^1$— in the case of amino groups in the main chain or a side chain, where the R$^1$ groups are the same or different and may each be selected from hydrogen, alkyl, cycloalkyl, alkenyl, aryl, alkaryl or aralkyl. As specific examples of the R$^1$ radicals, in addition to hydrogen, reference is made to the above examples for the corresponding R radicals with no amino group and the corresponding groups of the specific examples which follow. R$^1$ may also have substituents, for example hydroxyl, alkoxy, nitro, carbonyl, halogen or alkyl, or be interrupted by oxygen atoms. Examples of such R$^1$ groups are acryloyloxy, acetylglycyl, or hydroxyalkyl such as hydroxyethyl. The aminosilane is preferably a monomeric compound and contains preferably not more than 4 and more preferably not more than 3 silicon atoms. The aminosilane especially preferably contains only one silicon atom.

Specific examples of usable aminosilanes are aminopropyltriethoxysilane, aminopropyltrimethoxysilane, aminomethyltriethoxysilane, aminomethyltrimethoxysilane, aminopropyltrichlorosilane, (N-cyclohexylaminomethyl)triethoxysilane, 2-aminoethyl-3-aminopropyltrimethoxysilane, N-(n-butyl)-3-aminopropyltrimethoxysilane, 2-aminoethyl-3-aminopropylmethyldimethoxysilane, (3-aminopropyl)diethoxymethylsilane, (3-aminopropyl)ethyldiethoxysilane, (3-methylaminopropyl)trimethoxysilanes, (aminoethylaminomethyl)phenethyltrimethoxysilane, (N,N-diethyl-3-aminopropyl)trimethoxysilane, (N,N-dimethylamino)dimethylchlorosilane, (N,N-dimethylaminopropyl)trimethoxysilane, (N-acetylglycyl)-3-aminopropyltrimethoxysilane, (N-cyclohexylaminomethyl)methyldiethoxysilane, (N-cyclohexylaminomethyl)triethoxysilane, (N-phenylaminomethyl)methyldimethoxysilane, (N-phenylaminomethyl)trimethoxysilane, 11-aminoundecyltriethoxysilane, 3-(1,3-dimethylbutylidene)aminopropyltriethoxysilane, 3-(1-aminopropoxy)-3,3-dimethyl-1-propenyltrimethoxysilane, 3-(2,4-dinitrophenylamino)propyltriethoxysilane, 3-(2-aminoethylamino)propylmethyldimethoxysilane, 3-(2-aminoethylamino)propyltrimethoxysilane, 3-(cyclohexylamino)propyltrimethoxysilane, 3-(aminophenoxy)propyltrimethoxysilane, 3-(N-allylamino)propyltrimethoxysilane, 3-(N-styrylmethyl-2-aminoethylamino)propyltrimethoxysilane, 3-(phenylamino)propyltrimethoxysilane, 3-aminopropyldiisopropylethoxysilane, 3-aminopropyldimethylethoxysilane, 3-aminopropylmethylbis(trimethylsiloxy)silane, 3-aminopropylmethyldiethoxysilane, 3-aminopropyltris(methoxyethoxyethoxy)silane, 3-aminopropyltris(trimethylsiloxy)silane, 4-aminobutyltriethoxysilane, aminophenyltrimethoxysilane, bis(2-hydroxyethyl)-3-aminopropyltriethoxysilane, diethylaminomethyltriethoxysilane, N,N-dimethylaminomethylethoxysilane, N-(2-aminoethyl)-3-aminoisobutyldimethylmethoxysilane, N-(2-aminoethyl)-3-aminopropylmethyldimethoxysilane, N-(2-aminoethyl)-3-aminopropyltriethoxysilane, N-(2-aminoethyl)-3-aminopropyltrimethoxysilane, N-(2-aminomethyl)-11-aminoundecyltrimethoxysilane, N-(3-acryloyloxy-2-hydroxypropyl)-3-aminopropyltriethoxysilane, N-(3-methacryloyloxy-2-hydroxypropyl)-3-aminopropyltriethoxysilane, N-(6-aminohexyl)aminopropyltrimethoxysilane, N-(hydroxyethyl)-N-methylaminopropyltrimethoxysilane, N-3-[(amino(polypropyleneoxy)]aminopropyltrimethoxysilane, n-butylaminopropyltrimethoxysilane, N-cyclohexylaminopropyltrimethoxysilane, N-ethylaminoisobutylmethyldiethoxysilane, N-ethylaminoisobutyltrimethoxysilane, N-methylaminopropylmethyldimethoxysilane, N-methylaminopropyltrimethoxysilane, N-phenylaminomethyltriethoxysilane, phenylbis(dimethylamino)chlorosilane, tert-butylaminopropyltrimethoxysilane, aminopropylsilanetriol, N-(2-aminoethyl)-3-aminopropylsilanetriol, N-cyclohexylaminomethyltriethoxysilane, N-cyclohexylaminomethylmethyldiethoxysilane and N-phenylaminomethyltrimethoxysilane.

It is important that the aminosilane has at least one basic nitrogen atom which can be protonated by an acid.

The aminosilanes, and the other hydrolysable silanes which are optionally usable in addition for surface modification and are discussed below, can be prepared by known methods; cf. W. Noll, "Chemie and Technologie der Silicone" [Chemistry and Technology of the Silicones], Verlag Chemie GmbH, Weinheim/Bergstrasse (1968), and are commercially available.

Further unhydrolysable R radicals may be those having a reactive group, in which case these radicals may also be present especially in the other hydrolysable silanes which are optionally usable in addition for surface modification and are discussed below, where the reactive group is, for example, an acryloyl or acryloyloxy group, methacryloyl or methacryloyloxy group, a preferably protected isocyanate group, a hydroxyl, thio, glycidyl or glycidyloxy or acid anhydride group. These reactive groups may be bonded to the silicon atom via alkylene, alkenylene or arylene bridging groups which may be interrupted by oxygen or —NH— groups. The bridging groups contain preferably 1 to 18 and especially 1 to 6 carbon atoms. The divalent bridging groups mentioned and any substituents present derive, for example, from the above-mentioned monovalent alkyl, alkenyl, aryl, alkaryl or aralkyl radicals. The R radical may also bear more than one reactive group. More particularly, the aminosilane may also bear such a reactive group, for example on the radical with an amino group.

Examples of unhydrolysable R radicals with reactive groups are (meth)acryloyloxy-(C1-C6)-alkylene, e.g. (meth)acryloyloxymethyl, (meth)acryloyloxyethyl or (meth)acryloyloxypropyl, isocyanato-(C1-C6)-alkylene, such as 3-isocyanatopropyl, thio-(C1-C6)-alkylene, such as thiopropyl, glycidyloxy-(C1-C6)-alkylene, such as glycidyloxypropyl; (meth)acryloyl represents methacryloyl or acryloyl. Examples of corresponding aminosilanes, or the other hydrolysable silanes which have reactive groups, are optionally usable additionally and are discussed below are (meth)acryloyloxypropylsilanes and (meth)acryloyloxymethylsilanes, such as 3-(meth)acryloyloxypropyltriethoxysilane, 3-(meth)acryloyloxypropyltrimethoxysilane, 3-(meth)acryloyloxymethyltriethoxysilane and 3-(meth)acryloyloxymethyltrimethoxysilane, bis(2-hydroxyethyl)-3-aminopropyltriethoxysilane, optionally blocked 3-isocyanatopropyltriethoxysilane and 3-isocyanatopropyldimethylchlorosilane, hydroxymethyltriethoxysilane, mercaptopropyltriethoxysilane, glycidyloxypropyltrimethoxysilane and glycidyloxypropyltriethoxysilane.

In addition, one or more unhydrolysable R radicals in the aminosilane, and especially in the other hydrolysable silanes which are optionally usable in addition for surface modification and are discussed below, may have organic radicals substituted by fluorine, especially linear or branched (per)fluoroalkyl groups. Such fluorinated R groups preferably contain 1 to 30 fluorine atoms which are preferably bonded to aliphatic carbon atoms. The fluorine-substituted carbon atoms are preferably bonded to the Si via a nonfluorinated alkylene bridge, such as an ethylene group. Examples of fluorinated R radicals usable are $CF_3CH_2CH_2$—, $C_2F_5CH_2CH_2$—, $n-C_6F_{13}CH_2CH_2$—, $i-C_3F_7OCH_2CH_2CH_2$—, $n-C_8F_{17}CH_2CH_2$— and $n-C_{10}F_{21}$—$CH_2CH_2$—. Examples of fluorosilanes usable as additional silanes are $CF_3CH_2CH_2Si(CH_3)(OCH_3)_2$, $C_2F_5$—$CH_2CH_2$—Si(OCH$_3$)$_3$, n-C$_6$F$_{13}$—CH$_2$CH$_2$Si(OC$_2$H$_5$)$_3$, n-C$_8$F$_{17}$—CH$_2$CH$_2$—Si(OC$_2$H$_5$)$_3$, n-C$_{10}$F$_{21}$—CH$_2$CH$_2$—Si(OC$_2$H$_5$)$_3$, i-C$_3$F$_7$O—CH$_2$CH$_2$CH$_2$—SiCl$_2$(CH$_3$), n-C$_6$F$_{13}$—CH$_2$CH$_2$—Si(OCH$_2$CH$_3$)$_2$ and n-C$_6$F$_{13}$—CH$_2$CH$_2$—SiCl$_2$(CH$_3$).

As already discussed above, the aminosilane may optionally also be used in a mixture with one or more other hydrolysable silanes for surface modification, for example when it is desired to impart a further property to the silica. The further silane is preferably present in the aminosilane solution. In general, suitable hydrolysable silanes for this purpose are all of those which have at least one unhydrolysable group, said unhydrolysable group(s) not having any amino groups. Such silanes are known to those skilled in the art and are commercially available.

For example, the silanes may be of the above formula $R'_bSiY_{(4-b)}$ where the Y radicals are the same or different and are each hydrolysable groups or hydroxyl groups, the R' radicals are the same or different and are each unhydrolysable groups, where no R' comprises an amino group, and b has the value of 1, 2 or 3, preferably 1 or 2. Definitions and specific examples of the R' and Y radicals are, apart from the amino groups, the same as specified above for R and X in the aminosilanes, and reference is therefore made thereto. The R' radical(s) may, in addition to customary substituents as specified above, also contain the above-specified reactive functional groups, such as especially (meth)acryloyl groups, protected isocyanate groups, hydroxyl groups, thio groups and anhydride groups. Further suitable R radicals are linear or branched (per)fluoroalkyl groups. Examples of additional silanes with reactive groups or (per)fluoroalkyl groups have already been mentioned above. In addition, the silanes used in accordance with the invention may be what are known as Hydrosil systems. Hydrosil systems are understood here essentially to mean water-based, chloride-free, predominantly slightly acidic, aqueous systems which comprise a mixture of water-soluble, virtually fully hydrolysed (fluoro)alkyl-/aminoalkyl-/hydroxy- (or alkoxy-)siloxanes, as disclosed, for example, by EP 0 716127 A, EP 0 716128 A, EP 0 846 717 A, EP 1 101 787 A and DE 10 2007 040 802 A. The systems more preferably comprise aqueous siloxanes, VOC-free, i.e. free of volatile organic compounds, for example Dynasylan® HYDROSIL 1151, Dynasylan® HYDROSIL 2627, Dynasylan® HYDROSIL 2909, Dynasylan® HYDROSIL 2929, Dynasylan® HYDROSIL 2776 from Evonik Degussa GmbH. Finally, it is possible with particular preference to use Hydrosils with quaternary amino functions, as described in DE 10 2009 001966.

The inventive dispersions of precipitated silica are notable in that a) at least one aminosilane is bonded covalently to at least some sites on the surface of the precipitated silica particles by means of an Si—O—Si bond. It may be the case that an aminosilane is bonded covalently to the silica via an Si—O—Si bond, but it may also be the case that one aminosilane molecule has a plurality of OH groups, such that it may be bonded covalently to the silica by a plurality of Si—O—Si bonds.

b) the mean diameter $d_{50}$ of the surface-modified precipitated silica particles is between 50 and 500 nm, preferably 80 to 300 nm, more preferably 100 to 200 nm and most preferably 110 to 160 nm, and/or the $d_{90}$ of the particle size distribution curve of the surface-modified precipitated silica particles is between 150 and 800 nm, preferably 150 to 500 nm, more preferably 150 to 300 nm, even more preferably 150 to 250 nm, especially preferably 150 to 200 nm and very especially preferably 150 to less than 200 nm. As a result, the inventive dispersions enable use in the field of high-resolution inkjet printing.

c) the solids content of the dispersion is greater than or equal to 20% by weight, preferably between 20 and 60% by weight, more preferably 25 to 50% by weight and most preferably 25 to 40% by weight. As a result, the inventive dispersions have an economic advantage over dispersions with a lower solids content, for example those from EP 1 894 888. Compared to the known highly filled silica dispersions, all of which have been substantially freed of polyvalent anions, the inventive dispersions have the advantage that it is possible to dispense with the complicated purification, i.e. removal of the polyvalent anions.

d) the pH of the dispersion is less than or equal to 5. The low pH is necessary for cationization of the amino group of the aminosilanes, and ensures sufficient electrostatic repulsion of the particles in the dispersion from one another.

The precipitated silicas and aminosilanes present in the dispersions correspond to those described in detail above in the description of the process.

The inventive dispersions can be used for production of paper coatings, preferably paper coatings for inkjet paper, more preferably as a topcoat for glossy inkjet paper or as an anticorrosive primer for the coating of steel components, preferably steel pipes.

The physicochemical data of the precipitated silicas as the starting material and in the dispersion are determined as follows:

Determination of the Solids Content in the Dispersion and the Preliminary Dispersion The dispersion or the preliminary dispersion is dried to constant weight in an IR dryer. The drying loss consists predominantly of water moisture.

In this determination, 2.0 g of silica dispersion are introduced into a tared aluminium dish, and the lid of the IR drying unit (from Mettler, LP 16) is closed. After the start button has been pressed, the drying of the suspension commences at 105° C., and is ended automatically when the decrease in weight per unit time goes below the value of 2 mg/(120 s).

The weight decrease in % is displayed directly by the instrument when the 0-100% mode is selected. The solids content is calculated according to solids content in %=100%−weight decrease in %.

Determination of the Particle Size Distribution ($d_{50}$ and $d_{90}$)

The use of laser diffraction to determine particle sizes of powders is based on the phenomenon that particles scatter monochromatic light in all directions with a different intensity pattern. This scatter depends on the particle size. The smaller the particles, the greater the angles of scatter are.

In the case of hydrophilic precipitated silica the sample preparation and analysis (flushing of the module, etc.) are effected with demineralized water, and in the case of insufficiently water-wettable precipitated silica with pure ethanol.

Before the start of the analysis, the LS 230 laser diffraction instrument (from Coulter) and the liquid module (Small Volume Module Plus, 120 ml, from Coulter) are allowed to warm up for 2 h, the module is flushed three times with demineralized water and calibrated and, in the case of hydrophobic precipitated silicas, flushed three times with ethanol.

In the control bar of the instrument software, the "analysis" menu item is used to select the file window "calculate opt. model", and the refractive indices are recorded in an .rfd file: liquid refractive index B. I. real=1.332 (1.359 for ethanol); material refractive index real=1.46; imaginary=0.1; form factor 1. In addition, in this file window, the following points are selected: offset analysis, adjustment, background measurement, adjust analysis concentration, input sample info, input analysis info, analysis time 60 s, number of measurements 1, no PIDS data, size distribution. The pump speed is set to 30% on the instrument.

The homogeneous suspension of 1 g of silica in 40 ml of demineralized water is added with a 2 ml disposable pipette to the liquid module of the instrument in such a way that a constant concentration with a light absorption of 8 to 12% is achieved and the instrument gives the "OK" message. The analysis is effected at room temperature. The raw data curve is used by the software to calculate, on the basis of the volume distribution, taking account of Mie theory and the optical model parameters (.rfd file), the particle size distribution, the $d_{50}$ (median) and the $d_{90}$.

Determination of the BET Surface Area

The specific nitrogen surface area (referred to hereinafter as BET surface area) of the silica in pulverulent form, having approximately spherical particles or in granular form is determined based on ISO 5794-1/Annex D with the TRISTAR 3000 instrument (from Micromeritics) by the multipoint determination to DIN-ISO 9277.

Determination of the pH of the Dispersion

The pH of the dispersion is determined to ISO 787/9.

Determination of the pH of the Aminosilane Solution

The pH of the aminosilane solution is determined by known methods, by means of a combination electrode calibrated beforehand.

Determination of the $SiO_2$ Content

The $SiO_2$ content is determined to ISO 3262-19.

Determination of the Content of Inorganic Salts in the Preliminary Dispersion and in the Final Dispersion The content of inorganic salts in the silica dispersions not modified with silanes is calculated from the solids content of the dispersion, determined as described above, minus the $SiO_2$ content of the solid, determined as described above.

In the case of already surface-modified silica dispersions, the solids content of the dispersion, in addition to the $SiO_2$ content, additionally has to be corrected to take account of the amount of silane absorbed.

Determination of the Content of Polyvalent Anions (Sulphate, Carbonate, Phosphate) of the Silica Used to Produce the Preliminary Dispersion or of the Filtercake or of the Dispersion (for Example Liquefied Filtercake or Precipitate Suspension)

The sulphate content of the dried sample (moisture content below 10% by weight) is determined to ISO 787-13.

The carbonate content is determined by admixing 50-100 mg of the dried sample (moisture content below 10% by weight) with 10 ml of sulphuric acid (25%), and heating the solution by means of a gas flame (Bunsen burner) until it boils gently. By means of a vacuum pump, the gases which form are transported to a conductivity cell. The calibration is effected with $CaCO_3$.

In the context of the present invention, the phosphate content is determined via the total phosphorus content, i.e. it is postulated that all of the phosphorus in the silica is in the form of phosphate. The total phosphorus content is determined as follows:

Determination of Phosphorus in Silicas by Means of High-Resolution Inductively Coupled Plasma Mass Spectrometry (HR-ICPMS)

1-5 g of the dried sample (moisture content below 10% by weight) are weighed accurately to 1 mg into a PFA cup. 25-30 g of hydrofluoric acid (approx. 50%) are added. After tilting briefly, the PFA cup is heated to 110° C. in a heating block, such that the silica present in the sample as hexafluorosilicic acid and the excess hydrofluoric acid evaporate off gradually. The residue is dissolved with 0.5 ml of nitric acid (approx. 65%) and a few drops of hydrogen peroxide solution (approx. 30%) for about 1 hour and made up to 10 g with ultrapure water.

To determine phosphorus, 0.05 ml or 0.1 ml are taken from the digestion solutions, transferred into a polypropylene sample tube, admixed with 0.1 ml of indium solution (c=0.1 mg/l) as an internal standard and made up to 10 ml with dilute nitric acid (approx. 3%).

A phosphorus stock solution (c=10 mg/l) is used to make up four calibration solutions (c=0.1; 0.5; 1.0; 5.0 µg/l), again with the addition of 0.1 ml of indium solution (c=0.1 mg/l) to final volume 10 ml. In addition, blank solutions are prepared with 0.1 ml of indium solution (c=0.1 mg/l) to final volume 10 ml.

The element contents in the blank, calibration and sample solutions thus prepared are quantified by means of high-resolution inductively coupled mass spectrometry (HR-ICPMS) and by means of external calibration. The analysis is effected with a mass resolution (m/Δm) of at least 4000.

The examples which follow serve merely for better understanding of the present invention, but do not restrict it in any way.

Example 1

Production of the Preliminary Dispersion

A dispersing unit consisting of an Ultra-Turrax shear unit and a vessel was initially charged with 1200 g of demineralized water, and 619 g of Sipernat 200 were introduced homogeneously. This dispersion was heated to 70° C. by means of shear energy. Thereafter, 172 g of Dynasilan® 1189, which had been diluted to 20% in methanol, were added dropwise to this preliminary dispersion, and the pH was kept constant at pH 3 with 49 g of HCl.

Grinding of the Preliminary Dispersion

The grinding was carried out in an LS 1 stirred ball mill from Netzsch Condux. To this end, the preliminary dispersion was initially charged in a vessel heated to 60° C. and pumped by a pump into the grinding space of the mill, from which it flowed back again into the same vessel. The suspension was thus ground in circulation mode. After introduction of grinding energy, which was determined by the power consumption of the mill drive, the particle size distribution was determined. After 90 minutes of grinding time, a mean particle diameter $d_{50}$ of 150 nm and a $d_{90}$ of 240 nm were thus attained.

Use Test

The (crude) dispersion thus obtained was used to produce a paper coating, which showed a very good result in the use properties.

Example 2

Production of the Preliminary Dispersion

A dispersing unit consisting of an Ultra-Turrax shear unit and a vessel was initially charged with 1800 g of demineralized water, and 360 g of Carplex® 80 were introduced homogeneously. This dispersion was heated to 70° C. by means of shear energy. Subsequently, 100 g of Dynasilan® 1189, which was diluted to 20% in methanol, were added dropwise to this dispersion, and the pH was kept constant at pH 3 with 29 g of HCl. The suspension was then subjected to further shear at 70° C. for 30 minutes.

Grinding of the Preliminary Dispersion

The grinding was carried out in an LS 1 stirred ball mill from Netzsch Condux. To this end, the dispersion was initially charged in a vessel heated to 60° C. and pumped by a pump into the grinding space of the mill, from which it flowed back again into the same vessel. The suspension was thus ground in circulation mode. After introduction of grinding energy, which was determined by the power consumption of the mill drive, the mean particle size and the particle size distribution were determined on a sample by the method described. After 90 minutes of grinding time, a mean particle diameter $d_{50}$ of 140 nm and a $d_{90}$ of 230 nm were thus attained.

Use Test

The (crude) dispersion thus obtained was used to produce an anticorrosive primer, which showed a very good result in the use properties.

The invention claimed is:

1. A process for producing a dispersion comprising precipitated silica particles, comprising the steps of:
   a) producing a preliminary dispersion of at least one precipitated silica, wherein the preliminary dispersion has a content of inorganic salts of 0.00015 to 0.6% by weight based on the total weight of the preliminary dispersion, and
   b) supplying the preliminary dispersion to a grinding device with subsequent grinding,
   and wherein, in the course of the process, at least part of a surface of the precipitated silica particles, a surface of precipitated silica particles newly generated during the grinding, or a combination thereof are modified with at least one aminosilane in such a way that the aminosilane is attached covalently to the precipitated silica particles.

2. The process according to claim 1, wherein the inorganic salt comprises a polyvalent anion.

3. The process according to claim 1, wherein the preliminary dispersion is produced using at least one dried precipitated silica, at least one filtercake of a precipitated silica, or a combination thereof.

4. The process according to claim 1, wherein the precipitated silica particles present in the preliminary dispersion have a mean particle diameter $d_{50}$ of greater than 100 nm.

5. The process according to claim 1, wherein the precipitated silica in the preliminary dispersion has a solids content based on the total weight of the preliminary dispersion of 5 to 40% by weight.

6. The process according to claim 1, wherein a solution of at least one aminosilane is added at a time selected from any one or a combination of before, during, and after the grinding step b).

7. The process according to claim 6, wherein one or more of the preliminary dispersion, the dispersion comprising precipitated silica particles, and the solution of at least one aminosilane has a pH that is adjusted to a value less than 7 at a time selected from any one or a combination of before, during and after the solution of at least one aminosilane is added to the preliminary dispersion or the dispersion comprising precipitated silica particles.

8. The process according to claim 1, wherein the aminosilane has the general formula $R_aSiX_{(4-a)}$ in which the X radicals are the same or different and are each hydrolysable groups or hydroxyl groups, the R radicals are the same or different and are each unhydrolysable groups, where at least one R radical comprises at least one amino group, and a has a value of 1, 2 or 3.

9. The process according to claim 1, wherein the preliminary dispersion has a content of inorganic salts of 0.0024 to 0.03% by weight based on the total weight of the preliminary dispersion.

10. The process according to claim 2, wherein the polyvalent anion is selected from a divalent anion and a trivalent anion.

11. The process according to claim 4, wherein the mean particle diameter $d_{50}$ of the precipitated silica particles present in the preliminary dispersion is 1 to 500 μm.

12. The process according to claim 5, wherein the solids content of the precipitated silica in the preliminary dispersion, based on the total weight of the preliminary dispersion, is 25 to 35% by weight.

13. The process according to claim 6, wherein the solution of at least one aminosilane is added at a time selected from any one or a combination of: during step b), after step b), to the preliminary dispersion before step b), before the production of the preliminary dispersion, and during the production of the preliminary dispersion.

14. The process according to claim 7, wherein the pH of one or more of the preliminary dispersion, the dispersion comprising precipitated silica particles, and the solution of at least one aminosilane is adjusted to a value between 2 and 6, at a time selected from any one or a combination of before, during and after the aminosilane solution is added to the preliminary dispersion or the dispersion comprising precipitated silica particles.

15. A dispersion of precipitated silica particles, wherein
a) at least one aminosilane is bonded covalently to at least some sites on a surface of the precipitated silica particles,
b) the precipitated silica particles have a mean diameter $d_{50}$ of between 50 and 500 nm, a $d_{90}$ of a particle size distribution curve of between 150 and 800 nm, or a combination thereof,
c) the dispersion has a solids content of greater than or equal to 20% by weight,
d) the dispersion has a pH of less than or equal to 5, and
e) the dispersion has a content of inorganic salts of 0.00015 to 0.6% by weight based on the total weight of the dispersion.

16. The dispersion according to claim 15, wherein the mean diameter $d_{50}$ of the precipitated silica particles is between 110 to 160 nm, the $d_{90}$ of the particle size distribution curve of the precipitated silica particles is between 150 to 200 nm, or a combination thereof.

17. A method of producing a paper coating, comprising incorporating the precipitated silica dispersions according to claim 15 in to the paper coating.

18. The method according to claim 17, wherein the paper coating is a topcoat for glossy inkjet paper.

19. A method of producing an anticorrosive primer, comprising incorporating the dispersion of precipitated silica particles according to claim 15 in to the anticorrosive primer.

* * * * *